(12) United States Patent
Jiang et al.

(10) Patent No.: US 12,501,068 B2
(45) Date of Patent: Dec. 16, 2025

(54) SYSTEMS AND METHODS FOR INTER FRAME PREDICTION OF A VIDEO

(71) Applicant: ZHEJIANG DAHUA TECHNOLOGY CO., LTD., Zhejiang (CN)

(72) Inventors: Dong Jiang, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 60 days.

(21) Appl. No.: 18/395,492

(22) Filed: Dec. 23, 2023

(65) Prior Publication Data

US 2024/0129526 A1  Apr. 18, 2024

Related U.S. Application Data

(63) Continuation of application No. PCT/CN2022/088580, filed on Apr. 22, 2022.

(30) Foreign Application Priority Data

Jun. 24, 2021 (CN) .......................... 202110701709.4

(51) Int. Cl.
*H04N 19/52* (2014.01)
*H04N 19/159* (2014.01)
(Continued)

(52) U.S. Cl.
CPC ......... *H04N 19/587* (2014.11); *H04N 19/159* (2014.11); *H04N 19/176* (2014.11); *H04N 19/182* (2014.11); *H04N 19/52* (2014.11)

(58) Field of Classification Search
None
See application file for complete search history.

(56) References Cited

U.S. PATENT DOCUMENTS

2017/0257641 A1  9/2017  Dasari et al.
2021/0006815 A1  1/2021  Ahn et al.
(Continued)

FOREIGN PATENT DOCUMENTS

CN  101218829  7/2008
CN  110290388  9/2019
(Continued)

OTHER PUBLICATIONS

Gayathri Venugopal et al., Region-based Template Matching for Decoder-Side Motion Vector Derivation, IEEE Visual Communications and Image Processing, 2018, 4 pages.
(Continued)

*Primary Examiner* — Christopher G Findley
(74) *Attorney, Agent, or Firm* — METIS IP LLC (57) ABSTRACT

The present disclosure may relate to systems and methods for inter frame prediction of a video. A method may include setting, based on a block to be predicted of an image frame, a search template. The method may also include searching for, based on a search strategy, an optimal search block of the search template in a reference frame of the image frame. The method may further include determining, based on the optimal search block, prediction information of the block to be predicted.

20 Claims, 7 Drawing Sheets

(51) Int. Cl.
  *H04N 19/176* (2014.01)
  *H04N 19/182* (2014.01)
  *H04N 19/587* (2014.01)

(56) References Cited

U.S. PATENT DOCUMENTS

| | | | | |
|---|---|---|---|---|
| 2021/0021847 | A1* | 1/2021 | Moon | H04N 19/52 |
| 2022/0210438 | A1* | 6/2022 | Chen | H04N 19/172 |
| 2022/0217356 | A1 | 7/2022 | Jiang et al. | |

FOREIGN PATENT DOCUMENTS

| | | |
|---|---|---|
| CN | 110839155 | 2/2020 |
| CN | 112514392 | 3/2021 |
| CN | 112738529 | 4/2021 |
| WO | 2022267667 A1 | 12/2022 |

OTHER PUBLICATIONS

Chen, Tianmi et al., Adaptive Patch Matching for Motion Compensated Prediction, Circuits and Systems, IEEE International Symposium On, 2011, 4 pages.

Huang, Yu-Wen, et al., TEI: Decoder-Side Motion Vector Derivation with Switchable Template Matching, JCT-VC Meeting, 2010, 11 pages.

The Extended European Search Report in European Application No. 22827167.2 mailed on Aug. 22, 2024, 7 pages.

International Search Report in PCT/CN2022/088580 mailed on Jun. 6, 2022, 4 pages.

Written Opinion in PCT/CN2022/088580 mailed on Jun. 6, 2022, 5 pages.

Telecommunication Standardization Sector of ITU, ITU-T H.264, 2013.

Telecommunication Standardization Sector of ITU, ITU-T H.265, 2015.

* cited by examiner

Reference frame  Current frame

SYSTEMS AND METHODS FOR INTER FRAME PREDICTION OF A VIDEO

CROSS-REFERENCE TO RELATED APPLICATIONS

This application is a Continuation of International Application No. PCT/CN2022/088580, filed on Apr. 22, 2022, which claims priority to Chinese Patent Application No. 202110701709.4 filed on Jun. 24, 2021, the contents of which are incorporated herein by reference in their entirety.

TECHNICAL FIELD

The present disclosure generally relates to video coding technology, and in particular, to systems and methods for inter frame prediction of a video.

BACKGROUND

At present, the main inter frame prediction for video coding may utilize a block-based inter frame prediction manner. Using the block-based inter frame prediction manner, a matching block that is optimal to a current block in a reference frame may be searched by a motion search strategy or other search strategies, and motion information between the current block and the matching block may be recorded. In the existing inter frame prediction techniques, a spatial correlation of adjacent blocks is not fully utilized, and a correlation of contents in image frames of a video is not fully considered, negatively affecting a compression rate of inter frame coding.

Therefore, it is desirable to provide methods and systems for inter frame prediction of a video to improve a compression rate of inter frame coding.

SUMMARY

According to an aspect of the present disclosure, a method for inter frame prediction of a video may be provided. The method may include setting, based on a block to be predicted of an image frame, a search template. The method may also include searching for, based on a search strategy, an optimal search block of the search template in a reference frame of the image frame. The method may further include determining, based on the optimal search block, prediction information of the block to be predicted.

In some embodiments, the searching for an optimal search block of the search template in a reference frame of the image frame based on a search strategy may include determining, based on first motion information of the block to be predicted, a start point for a searching operation, and searching for, based on the start point and the search strategy, the optimal search block of the search template in a search range of the reference frame.

In some embodiments, the first motion information may include optimal motion information selected among various second motion information.

In some embodiments, the setting a search template based on a block to be predicted of an image frame may include designating a reconstructed reference region of the block to be predicted as the search template.

In some embodiments, the reconstructed reference region may include one of one or more upper neighboring coded pixels, one or more left neighboring coded pixels, or a combination of one or more upper neighboring coded pixels and one or more left neighboring coded pixels of the block to be predicted.

In some embodiments, the setting a search template based on a block to be predicted of an image frame may include designating a reconstructed reference region of the block to be predicted and the block to be predicted as the search template.

In some embodiments, the method may further include transmitting a type of the search template without transmitting motion information or other position information.

In some embodiments, the method may further include performing a decoding operation based on the type of the search template. The decoding operation may include obtaining the search template based on the type of the search template. The decoding operation may also include searching for the optimal search block in the reference frame based on the search template. The decoding operation may further include determining an optimal matching block as a prediction value of the block to be predicted based on the optimal search block.

In some embodiments, the setting, based on a block to be predicted of an image frame, a search template may include determining, based on a decoding strength, the search template.

In some embodiments, the search strategy may be determined based on the decoding strength.

According to another aspect of the present disclosure, a system for inter frame prediction of a video may be provided. The system may include at least one storage device storing executable instructions, and at least one processor in communication with the at least one storage device. When executing the executable instructions, the at least one processor may cause the system to perform a method. The method may include setting, based on a block to be predicted of an image frame, a search template. The method may also include searching for, based on a search strategy, an optimal search block of the search template in a reference frame of the image frame. The method may further include determining, based on the optimal search block, prediction information of the block to be predicted.

According to another aspect of the present disclosure, a non-transitory computer readable medium may be provided. The non-transitory computer readable medium may include a set of instructions. When executing the executable instructions, at least one processor may cause a system to perform a method. The method may include setting, based on a block to be predicted of an image frame, a search template. The method may also include searching for, based on a search strategy, an optimal search block of the search template in a reference frame of the image frame. The method may further include determining, based on the optimal search block, prediction information of the block to be predicted.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
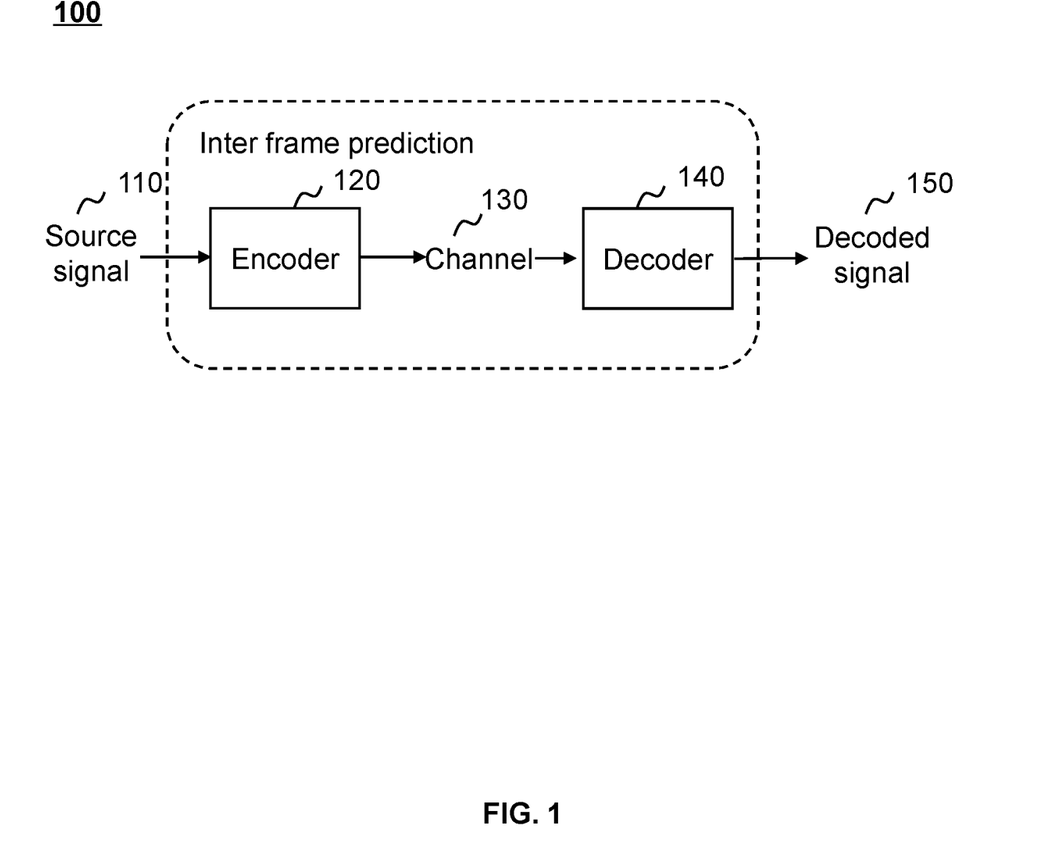
FIG. 1 is a schematic diagram illustrating an exemplary video processing system according to some embodiments of the present disclosure.

FIG. 1 is a schematic diagram illustrating an exemplary video processing system according to some embodiments of the present disclosure.

In some embodiments, a video processing system 100 for inter frame prediction of a video may be applied to a video compression system, such as an air television broadcasting system, a cable television transmission system, a satellite television transmission system, an Internet video transmission system, a digital video stored in media, etc. As used herein, video compression may refer to the reduction of the amount of data required to represent a video, which aims at reducing redundant information of video data, thereby storing and transmitting the video data effectively.

As shown in FIG. 1, the video processing system 100 may include a source signal 110, an encoder 120, a channel 130, a decoder 140, and a decoded signal 150.

In some embodiments, the source signal 110 may include a source signal of a video, which is shortly referred to as a video source. In some embodiments, the video source may include various uncompressed dynamic images, such as dynamic images with a digital video format.

During video data processing, inter frame prediction may include compressing video data by removing spatial redundant information based on a strong correlation between adjacent pixels in the same frame. In some embodiments, the inter frame prediction may be implemented by the encoder 120 and the decoder 140.

In some embodiments, the encoder 120 may refer to a first compression standard of the video source implemented by software and/or hardware applications. The encoder 120 may be configured to compress the video source signal in a transmission end.

In some embodiments, the decoder 140 may refer to a second compression standard of the video source implemented by software and/or hardware applications. The decoder 140 may be configured to reconstruct an approximation of the video source in a receiving end for playback.

In some embodiments, the encoder 120 may be configured to perform a transformation and/or quantization operation on residual information generated by the inter frame prediction. The residual information after the transformation and/or quantization operation may be transmitted to a decoding end through entropy coding. The decoder 140 may extract the residual information generated by the inter frame prediction from information (e.g., the residual information after the entropy coding) transmitted by the encoder 120, and determine a prediction value based on a prediction value of motion estimation.

In some embodiments, the channel 130 may include a wireless channel, a wired channel, or a frequency band that is used to transmit or store encoded video data. For example, the channel 130 may include a twisted pair, a cable, an optical fiber, or a medium capable of transmitting an electromagnetic wave, etc.

In some embodiments, the decoded signal 150 may refer to data reconstructed from the source signal 110 after being encoded and decoded. The decoded signal 150 may include video data after being compressed and decompressed.

In some embodiments, the encoded video data may be stored in a hard disk. The encoded video data may be read from the hard disk for subsequent decoding processing.

In some embodiments, the video processing system 100 may include a channel encoder. The channel encoder may refer to a device or program that is configured to further encode the encoded source signal in the transmission end before the source signal is transmitted in the channel 130, thereby improving an error correction function. In some embodiments, the video processing system 100 may include a channel decoder. The channel decoder may be configured to detect and correct an error caused by the transmission of the encoded source signal in the receiving end. The encoded source signal may be decompressed by the decoder 140.

It should be noted that the above descriptions are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
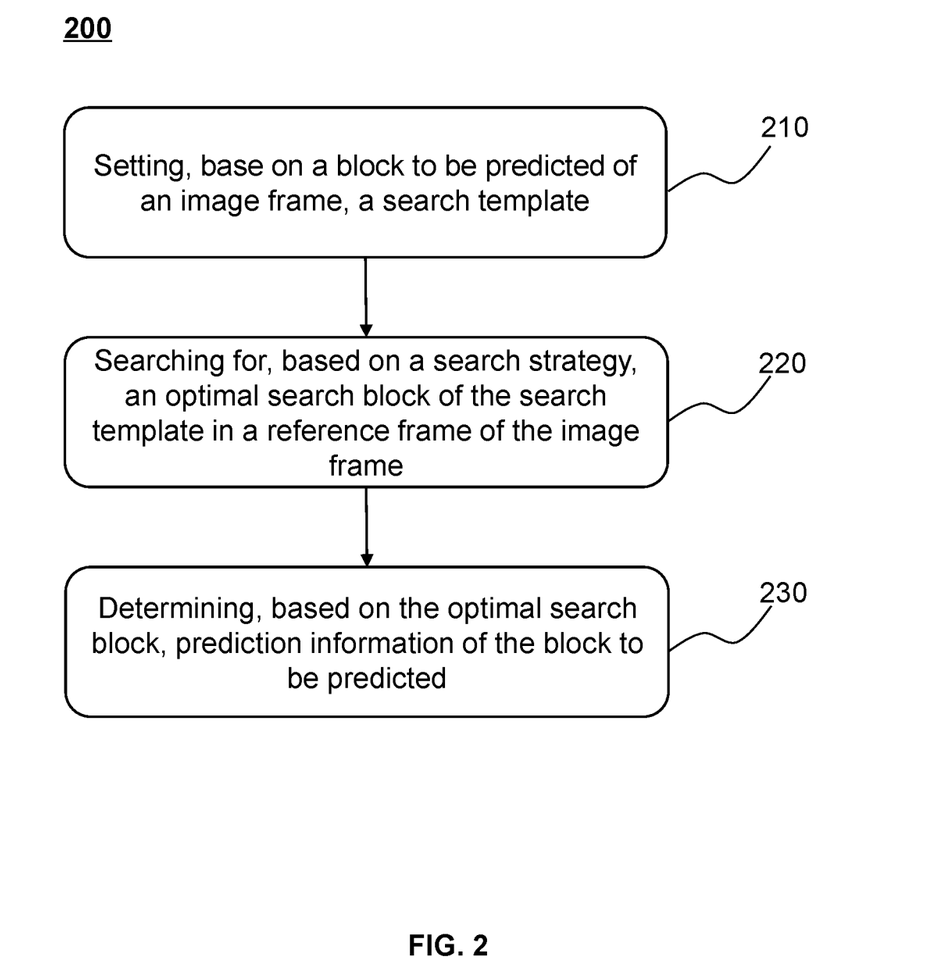
FIG. 2 is a flowchart illustrating an exemplary process for inter frame prediction of a video according to some embodiments of the present disclosure.

FIG. 2 is a flowchart illustrating an exemplary process for inter frame prediction of a video according to some embodiments of the present disclosure. In some embodiments, the process 200 may be implemented by an image compensation system (e.g., an image compensation system 600 illustrated in FIG. 6). In some embodiments, the image compensation system may be implemented by software and/or hardware, and/or may be integrated into an image compensation device (e.g., an image compensation device 700 illustrated in FIG. 7) that includes a processing device (e.g., a processing device 710). In some embodiments, at least part of the process 200 may be performed by the processing device including at least one processor and a storage device (e.g., a storage 720). For example, the process 200 may be stored in the storage device in the form of instructions (e.g., an application), and invoked and/or executed by the processing device. The operations of the illustrated process presented below are intended to be illustrative. In some embodiments, the process 200 may be accomplished with one or more additional operations not described, and/or without one or more of the operations discussed. Additionally, the order in which the operations of the process 200 as illustrated in FIG. 2 and described below is not intended to be limiting. As shown in FIG. 2, the process 200 may include the following operations.

In 210, a search template may be set based on a block to be predicted (also referred to as a current block) of an image frame. In some embodiments, operation 210 may be performed by a setting module 610.

As used herein, the block to be predicted may refer to a block to be coded and to be decoded in the image frame (e.g., a current frame).

The search template may refer to an image block used to search for an optimal matching block of the block to be predicted. The utilization of the search template may be referred to the descriptions of operation 220.

Figure 3:
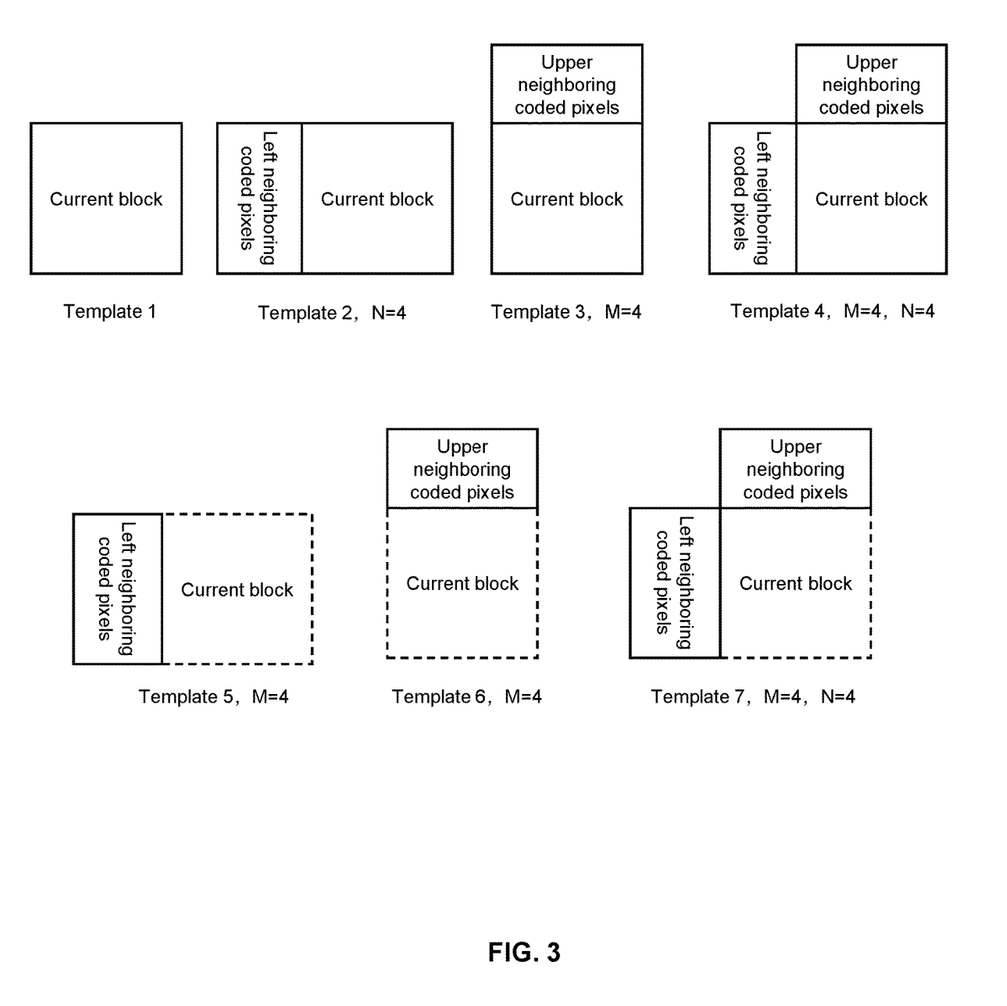
FIG. 3 is a schematic diagram illustrating exemplary search templates according to some embodiments of the present disclosure.

In some embodiments, the block to be predicted may be designated as the search template, for example, template 1 shown in FIG. 3.

In some embodiments, a reconstructed reference region of the block to be predicted may be designated as the search template. The reconstructed reference region may be a portion of the current frame that has been reconstructed. "Has been reconstructed" used herein may indicate that prediction has been performed and at least one prediction value has been determined for the portion of the current frame. The reconstructed reference region may be determined based on the at least one prediction value. A range of the reconstructed reference region may be determined in various manners.

In some embodiments, the reconstructed reference region may include one of one or more coded pixels located at the upper side (also referred to as upper neighboring coded pixels) of the current block, one or more coded pixels located at the left side (also referred to as left neighboring coded pixels) of the current block, or a combination of one or more upper neighboring coded pixels and one or more left neighboring coded pixels of the block to be predicted. As used herein, coded pixels refer to pixels in the image frame that has been encoded. "Left side" used herein may refer to a position that is in the left of the block to be predicted in the current frame, and "upper side" used herein may refer to a position in the current frame that is above the block to be predicted in the current frame. In some embodiments, the current frame may include a first boundary, a second boundary that is perpendicular to the first boundary, a third boundary that is parallel to the first boundary, and a fourth boundary parallel to the second boundary. In some embodiments, the reconstructed reference region may be related to an encoding direction or a searching direction. For example, if the encoding direction is from the first boundary to the third boundary, and from the second boundary to the fourth boundary, the reconstructed reference region may include one of one or more coded pixels located between the first boundary and the current block, one or more coded pixels located between the second boundary and the current block, or combination thereof. As a further example, if the first boundary is a left boundary and the second boundary is an upper boundary, the reconstructed reference region may include one of the upper neighboring coded pixels of the current block, left neighboring coded pixels of the current block, or a combination thereof.

In some embodiments, the reconstructed reference region of the block to be predicted may be obtained, and the search template may be set based on the reconstructed reference region of the block to be predicted. For example, the search template may be the reconstructed reference region of the block to be predicted. Taking template 5, template 6, and template 7 shown in FIG. 3 as an example, the search template (denoted by solid lines) may be the reconstructed reference region of the block to be predicted. If the reconstructed reference region includes one or more left neighboring coded pixels, the search template may correspond to the template 5 in FIG. 3. If the reconstructed reference region includes one or more upper neighboring coded pixels, the search template may correspond to the template 6 in FIG. 3. If the reconstructed reference region includes one or more left neighboring coded pixels and one or more upper neighboring coded pixels, the search template may correspond to the template 7 in FIG. 3. A count of rows of the one or more upper neighboring coded pixels may be M, and a count of columns of the one or more left neighboring coded pixels may be N, wherein M≥1, N≥1.

In some embodiments, the block to be predicted and the reconstructed reference region of the block to be predicted may be obtained. The search template may be set based on the block to be predicted and the reconstructed reference region of the block to be predicted. For example, the search template may be a combination of the reconstructed reference region of the block to be predicted and the block to be predicted. The search template may be rectangular or non-rectangular. Taking template 2, template 3, and template 4 in FIG. 3 as an example, the search template (denoted by solid lines) may be a combination of the block to be predicted and the reconstructed reference region of the block to be predicted. If the reconstructed reference region includes one or more left neighboring coded pixels, the search template may correspond to the template 2 in FIG. 3. If the reconstructed reference region includes one or more upper neighboring coded pixels, the search template may correspond to the template 3 in FIG. 3. If the reconstructed reference region includes one or more left neighboring coded pixels and one or more upper neighboring coded pixels, the search template may correspond to the template 4 in FIG. 3. A count of rows of the one or more upper neighboring coded pixels may be M, and a count of columns of the one or more left neighboring coded pixels may be N, wherein M≥1, N≥1.

In some embodiments, the search template may be determined based on a decoding strength.

The decoding strength may refer to a computing capability of a decoder (e.g., the decoder 140 in FIG. 1) required for decoding. Some compression techniques may have higher compression rates, and higher computing capabilities and higher requirements may be required for completing the decoding within a same time period. Decoding strengths of such compression techniques may be high. Different decoding strengths may be suitable for different application requirements.

In some embodiments, the decoding strength may be preset for the video compression.

In some embodiments, if the decoding strength is relatively high, a search template that excludes the block to be predicted may be selected, such as the template 5, the template 6, or the template 7 in FIG. 3. If the decoding strength is average, a template including the block to be predicted may be selected, such as the template 1, 2, 3, or 4 in FIG. 3, etc., that includes the block to be predicted.

In 220, an optimal search block of the search template in a reference frame of the image frame may be searched based on a search strategy. In some embodiments, operation 220 may be performed by a search module 620.

In some embodiments, the reference frame may refer to a previous frame that has been encoded and decoded. During an encoding process, based on the search template, a plurality of search blocks in the reference frame may be obtained based on various search strategies. A difference between the search template and each of the plurality of search blocks may be determined. One of the plurality of search blocks with the smallest difference may be designated as the optimal search block. The differences may be determined by various preset manners.

In some embodiments, a start point for a searching operation (also referred to as a start search point) using the search strategy may be determined based on first motion information (e.g., a motion vector) of the block to be predicted. The optimal search block of the search template may be searched based on the start search point and the search strategy in a search range of the reference frame.

Motion information (e.g., a motion vector) may reflect a positional relationship of a target position relative to a position of the block to be predicted, and be expressed in various forms. In some embodiments, the target position may refer to a position of the blocked to be predicted in the reference frame. In some embodiments, a candidate motion information list of the block to be predicted may be constructed, and the motion information may be determined based on the candidate motion information list.

The first motion information may be motion information used for the searching operation. Based on the first motion information and the position of the block to be predicted, the target position may be designated as the start search point. In some embodiments, other adjustments on the target position may be performed to determine the start search point.

The search range may be a range for further matching the search block and the search template based on the start search point. In some embodiments, the search range may include a rectangle whose center is the start search point, and a distance between the start search point and a boundary of the rectangle along a horizontal direction or a vertical direction may be within a distance threshold (e.g., K pixels), wherein K is a natural number.

The searching operation may be enriched based on the manners mentioned above.

In some embodiments, the first motion information may include a portion of motion information in the candidate motion information list of the block to be predicted after the candidate motion information list is tailored. In some embodiments, the first motion information may be determined based on items in the candidate motion information list.

In some embodiments, the first motion information may include optimal motion information selected among various second motion information. The second motion information may include motion information obtained from the candidate motion information list. In some embodiments, the second motion information may be a portion of the motion information in the candidate motion information list after the candidate motion information list is tailored. In some embodiments, the second motion information may be determined based on items in the candidate motion information list. For example, an average of multiple candidate motion information in the candidate motion information list may be designated as the second motion information.

Multiple search blocks may be obtained based on the various second motion information. A search block that matches the search template best (e.g., the search block with the smallest difference) among the multiple search blocks may be determined. Second motion information corresponding to the search block that matches the search template best may be the optimal motion information among the various second motion information and designated as the first motion information. Further searching for the start search point may be performed in the search range.

In some embodiments, a candidate motion information list of the block to be predicted may be constructed. The candidate motion information list may include various second motion information. Optimal motion information selected among the various second motion information may be designated as the first motion information. In some embodiments, the candidate motion information list may be reconstructed based on an advanced motion vector prediction (AMVP) mode and a merge mode. A length of the candidate motion information list may be 2 for the AMVP mode. A length of the candidate motion information list may be 6 for the merge mode. In some embodiments, each piece of the various second motion information may be represented by a vector (i.e., motion vector), and the length of the candidate motion information list may refer to a count of vectors that are used to represent the various second motion information.

In some embodiments, the start search point may be determined based on a co-located block of the block to be predicted in the reference frame or the motion information of the candidate motion information list. The optimal search block of the search template within the search range may be searched based on the search strategy. Search blocks may be searched in the reference frame based on the search template and the first motion information of the candidate motion information list. The difference between the search template and each search block may be determined. A search block with the smallest difference may be designated as the optimal search block.

The present disclosure may provide three search strategies. It should be noted that the three search strategies may be applicable to various search templates.

Figure 4:
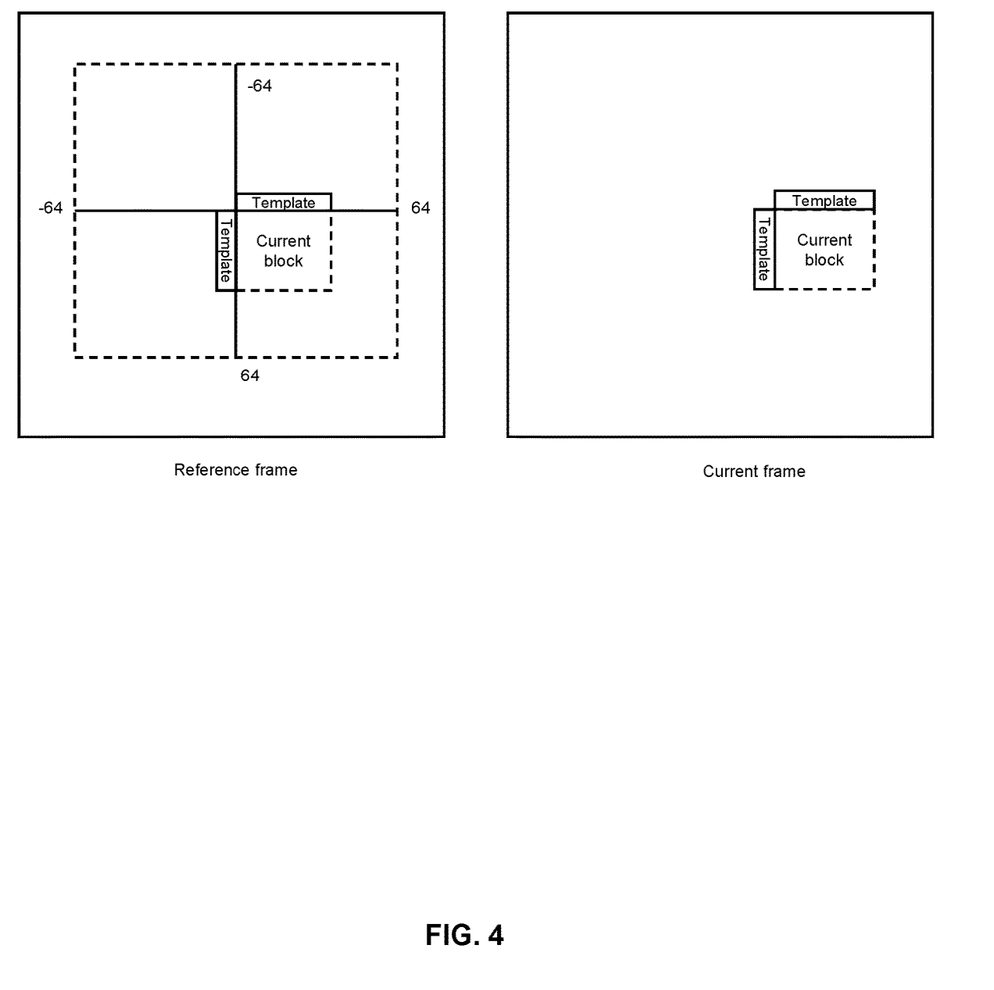
FIG. 4 is a schematic diagram illustrating an exemplary search strategy according to some embodiments of the present disclosure.

(1) A First Search Strategy:

The co-located block that is at the same position as the block to be predicted in the reference frame of the block to be predicted may be determined. The position of the co-located block may be designated as the start search point. A template matching operation may be performed within a search range [−K, K] in an integer pixel manner or a sub-pixel manner. The co-located block may refer to a block with the same position as the block to be predicted in the reference frame. Taking K=64 as an example, that is, taking the search range being [−64, 64] as an example, the search template may include the template 7 in FIG. 3 or other search templates. As shown in FIG. 4, the searching operation may be performed within a range defined by dotted lines of the reference frame.

(2) A Second Search Strategy:

A portion or all of the motion information in the candidate motion information list may be selected. A corresponding block in the reference frame may be determined using motion information derived from the portion or all of the motion information and designated as the start search point. A template matching operation may be performed within the search range [−K, K] in an integer pixel manner or a sub-pixel manner.

In some embodiments, one piece of the motion information selected from the candidate motion information list may be designated as the first motion information. The corresponding block in the reference frame may be determined using the piece of the motion information and designated as the search start point.

Figure 5:
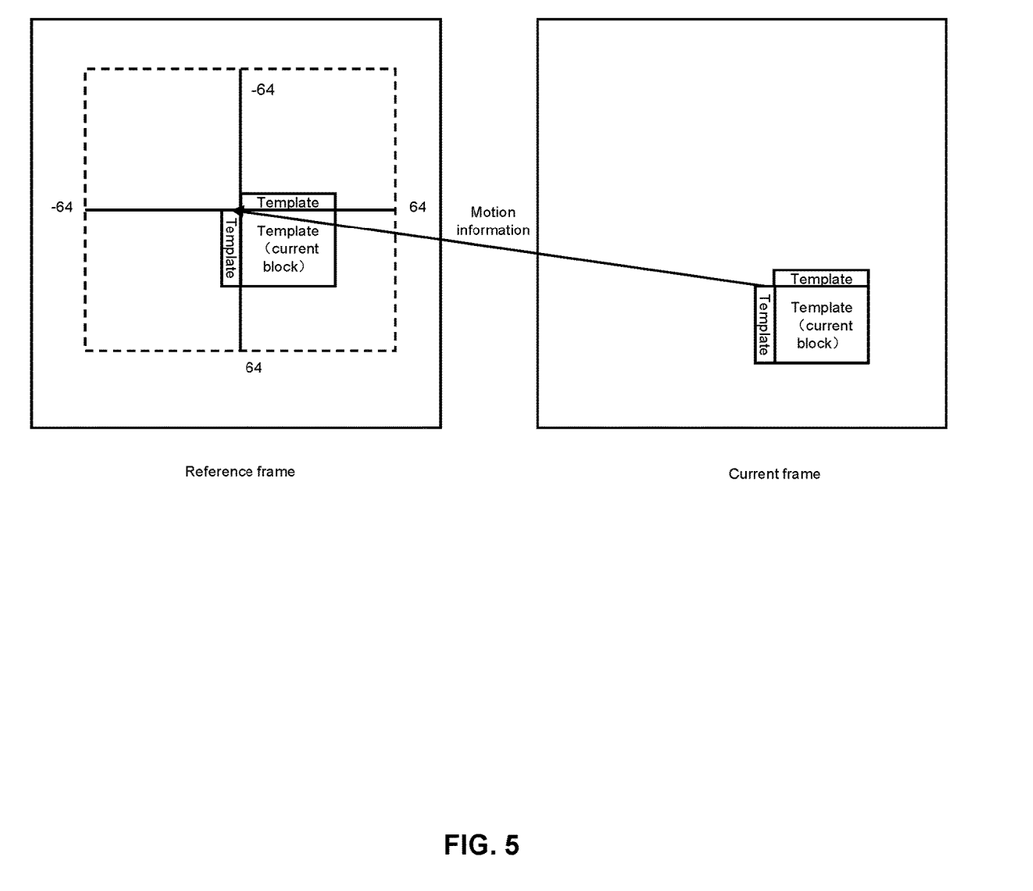
FIG. 5 is a schematic diagram illustrating an exemplary search strategy according to some embodiments of the present disclosure.

For example, under the AMVP mode, an AMVP candidate list may be constructed firstly. The AMVP candidate list may include two motion information candidate terms (e.g., two candidate motion vectors, MVs). The corresponding block in the reference frame may be determined using a first one (e.g., one of the two motion candidate terms) of the two motion information candidate terms in the list and designated as the start search point. A motion vector of the first motion information candidate term may be half-pixel accurate. If K=64, that is, the search range is [−64, 64], the search template may include the template 4 in FIG. 3 or other search templates. As shown in FIG. 5, the searching operation may be performed within a range defined by dotted lines of the reference frame. The template searching operation may be performed in the search range with a spacing value of 2 pixels. If a search position is not an integer pixel position, the search position may be determined using a neighbor integer pixel interpolation technique. The determination of the optimal matching block in the second search strategy may be the same as the determination of the optimal matching block described in the first search strategy as illustrated above.

In some embodiments, at least two pieces of first motion information may be selected from the candidate motion information list. The corresponding block in the reference frame may be determined based on the at least two pieces of first motion information and designated as the start search point.

For example, under the merge mode, a merge candidate list may be constructed firstly. The merge candidate list may include 6 motion information candidate terms. The corresponding block in the reference frame may be determined using any two (e.g., the top two) of the 6 motion information candidate terms and designated as the start search point. A motion vector of a first one of the 6 motion information candidate terms may be ¼ pixel accurate. A motion vector of a second one of the 6 motion information candidate terms may be integer pixel accurate. If K=64, that is, the search range is [−64, 64], the search template may include the template 5, the template 6, and the template 7 in FIG. 3 or other search templates. Similar to the second search strategy in FIG. 5, the searching operation may be performed within a range defined by dotted lines of the reference frame.

Firstly, the first one of the 6 motion information candidate terms may be designated as the start search point, and the searching operation may be performed by traversing the 3 templates (e.g., the template 5, the template 6, and the template 7 in FIG. 3) in the search range with a spacing value of 4 pixels. If a search position is not a position of the integer pixel, the search position may be obtained using a neighbor integer pixel interpolation technique. The determination of the optimal matching block in the second search strategy may be the same as the determination of the optimal matching block described in the first search strategy as illustrated above, and an optimal matching block of the block to be predicted may be selected while the first one of the 6 motion information candidate terms is designated as the start search point. Then the second one of the 6 motion information candidate terms is designated as the start search point, the searching operation may be performed by traversing the 3 templates in the search range with a spacing of 1 pixel. The determination of the optimal matching block in the second search strategy may be the same as the determination of the optimal matching block described in the first search strategy as illustrated above, and an optimal matching block of the block to be coded may be selected while the second one of the 6 motion information candidate terms is designated as the start search point for the searching operation.

Rate-distortion costs of the two optimal matching blocks mentioned above may be compared. A matching block (also referred to as the optimal matching block) among the two optimal matching blocks with a smaller cost may be the optimal matching block of the block to be coded under the merge mode.

In some embodiments, all motion information may be selected from the candidate motion information list. The corresponding block in the reference frame may be determined using motion information derived from the all motion information and designated as the start search point.

For example, under the AMVP mode, an AMVP candidate list may be constructed firstly. The AMVP candidate list may include two motion information candidate terms. An average of the two information candidate terms and a reference frame corresponding to one of the two motion information candidate terms may be designated as the motion information, and then the corresponding block in the reference frame may be determined and designated as the start search point. A motion vector of the motion information may be half-pixel accurate. If K=64, that is, the search range is [−64, 64], the search template may include the template 4 in FIG. 3 or other search templates. As shown in FIG. 5, the searching operation may be performed within a range defined by dotted lines of the reference frame. The template searching operation may be performed in the search range with a spacing value of 2 pixels. If a search position is not an integer pixel position, the search position may be determined using a neighbor integer pixel interpolation technique. The determination of the optimal matching block in the second search strategy may be the same as the determination of the optimal matching block described in the first search strategy as illustrated above.

(3) A Third Search Strategy:

After the first motion information is selected by comparing the costs based on an inter frame prediction mode, the first motion information may be refined by performing the template matching operation. In some embodiments, the corresponding block in the reference frame may be determined based on the first motion information and designated as the start search point. The template matching operation may be performed within the search range [−K, K] in the integer pixel manner or the sub-pixel manner.

For example, under the merge mode, after the first motion information is obtained, the corresponding block in the reference frame may be determined based on the first motion information and designated as the start search point. The motion vector of the first motion information may be integer pixel accurate. If K=64, that is, the search range is [−64, 64], the search template may include the template 7 in FIG. 3 or other search templates. As shown in FIG. 5, the searching operation may be performed within a range defined by dotted lines of the reference frame. The template searching operation may be performed in the search range with a spacing value of 1 pixel. The determination of the optimal matching block in the third search strategy may be the same as the determination of the optimal matching block described in the first search strategy or the second search strategy as illustrated above.

In some embodiments, the search strategy may be determined based on at least one of the decoding strength or the search template.

Taking the template 1, 2, 3, or 4 as an example, since the search template includes the block to be predicted and the block to be predicted is uncoded, a motion vector or a residual from the block to be predicted to the optimal matching block in a code stream may need to be coded. If the residual from the block to be predicted to the optimal matching block is encoded, a motion vector corresponding to the start search point may be designated as the optimal motion vector of the block to be predicted. The decoding end may obtain the optimal motion vector of the block to be predicted based on the motion vector or the residual determined directly or indirectly from the code stream.

Taking the template 5, 6, or 7 as an example, under a condition that the complexity of the decoding end is substantially not increased and the network bandwidth is sufficient, a motion vector or a residual from the block to be predicted to the optimal matching block in a code stream may need to be coded. The decoding end may decode a motion vector or a residual in the code stream to obtain the optimal matching block of the block to be predicted. If the decoding strength is higher than a threshold, an encoding end may be unnecessary to encode the motion vector or the residual in the code stream. The decoding end may determine the optimal matching block based on the residual and the same search strategy utilized by the encoding end. Therefore, a syntax element may be added to any one of a picture parameter set (PPS), a sequence parameter set (SPS), or a slice header. The syntax element may be used to control whether it is necessary to transmit the motion vector or the residual, the search strategy utilized at the encoding end when the motion vector or the residual is not transmitted, etc.

In some embodiments, after the search strategy is determined, a difference between each search block and the search template may be compared. A search block with the smallest difference may be designated as the optimal search block of the search template. A matching block of the optimal search block that is at a position corresponding to the block to be coded may be designated as the optimal matching block of the block to be coded. A comparison criterion for comparing the difference between each search block and the search template may include a criterion of a minimum of the sum of absolute differences (SAD). In some embodiments, the SAD between all pixel values at corresponding positions of each search block and the search template may be compared. The search block with the smallest SAD may be selected as the optimal search block of the search template, and the matching block of the optimal search block that is at the position corresponding to the block to be coded may be designated as the optimal matching block of the block to be coded. The SAD may be expressed as follows Equation (1):

$$SAD_k = \Sigma_k |s(x,y) - c(x,y)|, \quad (1)$$

where k refers to a count number of the search block, s and c refer to the search block and the search template, respectively, and x and y refer to the abscissa and the ordinate of a same position in the search block and the search template, respectively.

The comparison criterion mentioned above may not involve multiplication and division calculation, which is suitable to be implemented by hardware.

In some embodiments, the comparison criterion may also include a criterion of the minimum mean square error (MSE), a criterion of the minimum mean absolute difference (MAD), a criterion of the minimum number of threshold difference (NTD), etc.

In 230, prediction information of the block to be predicted may be determined based on the optimal search block. In some embodiments, operation 230 may be performed by a prediction module 630.

In some embodiments, the prediction information may include information (e.g., a type thereof) of the search template. For example, assuming that the search template is the template 5 in FIG. 3, the type of the search template may be denoted by a serial number "5", the prediction information may include the serial number "5".

In some embodiments, the prediction information may be transmitted to the decoding end (e.g., the decoder 140 as shown in FIG. 1) during the transmission. The decoding end may obtain the optimal matching block of the block to be predicted by searching in the reference frame based on the prediction information. For example, the prediction information may include one or more left neighboring coded pixels of the block to be predicted. The decoding end may obtain the matching block of the block to be predicted by searching in the reference frame based on the one or more left neighboring coded pixels.

In some embodiments, a type of the search template may be transmitted without transmitting the motion information or other position information. For example, if the search template includes the template 5 in FIG. 3, the type of the search template may be denoted by a serial number "5", and the serial number "5" may be transmitted. In some embodiments, after the reconstructed reference region of the block to be predicted is designated as the search template, the type of the search template may be transmitted without transmitting the motion information (e.g., the motion vector) or other position information.

In some embodiments, the decoding operation may be performed based on the type of the search template. For example, the type of the search template may include a serial number of the search template. For example, the type of search template 5 in FIG. 3 may include the serial number "5".

In some embodiments, the decoding operation may include obtaining the search template that is used to encode the block based on the type of the search template, searching for the optimal search block in the reference frame based on the search template, and determining the matching block based on the optimal search block and designating the matching block as the prediction value of the block to be predicted. Specifically, the search template may be obtained from the reconstructed reference region based on the type of the search template. For example, assuming that the type of the search template is 5, one or more left neighboring coded pixels of the block to be predicted may be obtained as the search template, and then the optimal search block may be searched in the reference frame based on the search template. In some embodiments, the optimal search block may be a search block with the smallest difference from the search template. The matching block corresponding to the optimal search block may be used as the prediction value of the block to be predicted.

In some embodiments, only the type of the search template (e.g., the serial number "5") may be transmitted during the transmission without transmitting the corresponding motion information. In some embodiments, a residual between the optimal matching block and the block to be predicted during the encoding operation may be simultaneously transmitted during the transmission. In some embodiments, the residual may be not transmitted during the transmission. Corresponding processing may be performed during the decoding operation.

Through the manners mentioned above, only the type of the search template may need to be transmitted, and the motion information may not need to be transmitted, such that the amount of data transmitted during the encoding operation may be reduced, thereby improving the compression rate of the encoding.

In some embodiments, an identifier of a syntax element may be added. The decoder may decode a code stream based on the syntax element. For example, a first syntax element may be set to identify the utilization of prediction information to encode the block to be coded. A second syntax element may also be set to identify at least one of a setting manner of the search template, a determination manner of the start search point, an index of the search template, or the search strategy.

In some embodiments, the syntax element may include but is not limited to: (1) the syntax element identifying the mode may be added; (2) if multiple search templates are selected, the syntactic element identifying the index of the search templates may be added; (3) if multiple start search points are selected, the syntactic element identifying the start search points may be added; (4) the syntax element identifying the motion vector may be added.

Based on the processed for predicting the inter frame of the video described in the present disclosure and by utilizing the similarity between the search block and the search template in the reference frame, the optimal matching block of the block to be predicted in the reference frame may be determined by various search strategies, thereby reducing the time redundancy and improving the compression rate of inter frame coding.

Figure 6:
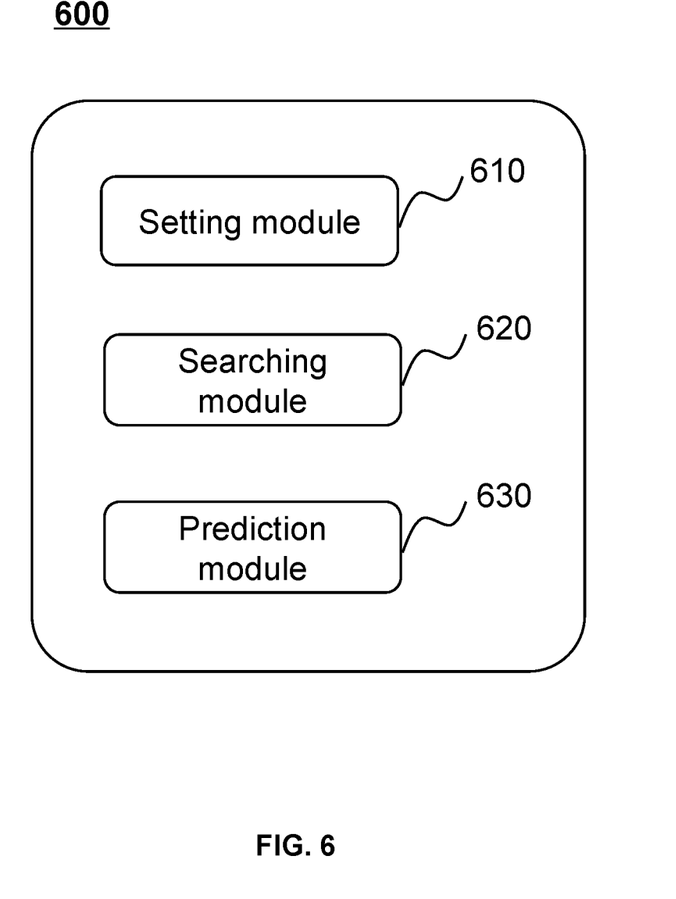
FIG. 6 is a block diagram illustrating an exemplary image compensation system according to some embodiments of the present disclosure.
Figure 7:
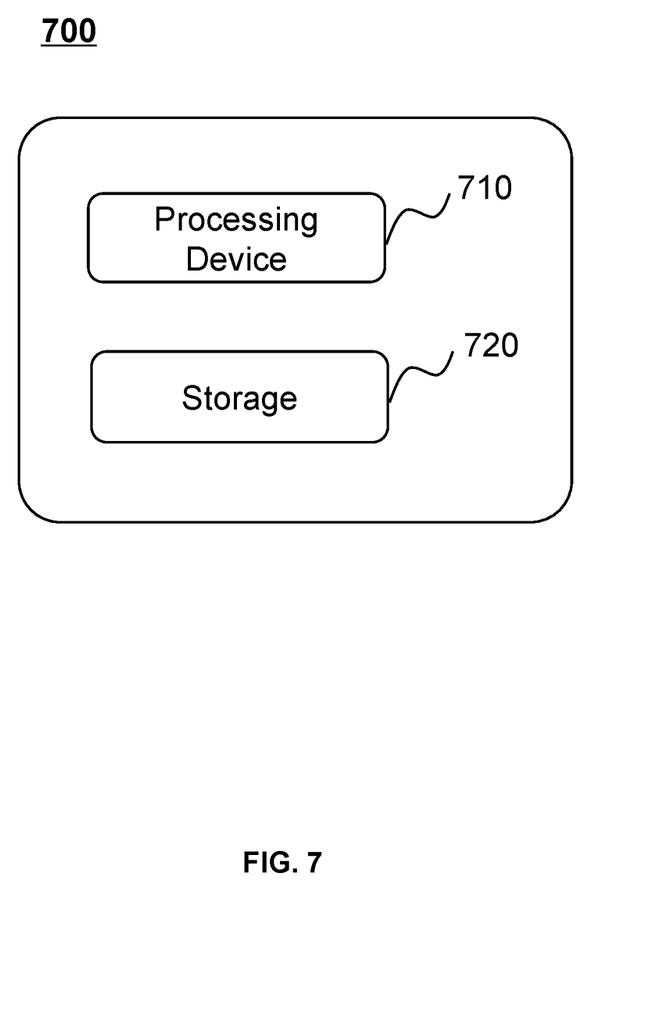
FIG. 7 is a block diagram illustrating an exemplary image compensation device according to some embodiments of the present disclosure.

FIG. 6 is a block diagram illustrating an exemplary image compensation system according to some embodiments of the present disclosure. As shown in FIG. 6, the image compensation system 600 may include a setting module 610, a search module 620, and a prediction module 630.

In some embodiments, the setting module 610 may be configured to set a search template based on a block to be predicted (also referred to as a current block) of an image frame. More descriptions regarding the setting, based on a block to be predicted of an image frame, a search template may be found elsewhere in the present disclosure, for example, operation 210 in FIG. 2 and relevant descriptions thereof.

In some embodiments, the search module 620 may be configured to search for an optimal search block of the search template in a reference frame of the image frame based on a search strategy. More descriptions regarding the searching for, based on a search strategy, an optimal search block of the search template in a reference frame of the image frame may be found elsewhere in the present disclosure, for example, operation 220 in FIG. 2 and relevant descriptions thereof.

In some embodiments, the prediction module 630 may be configured to determine prediction information of the block to be predicted based on the optimal search block. More descriptions regarding the determining, based on the optimal search block, prediction information of the block to be predicted may be found elsewhere in the present disclosure, for example, operation 230 in FIG. 2 and relevant descriptions thereof.

The modules in the image compensation system 600 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for inter frame prediction of a video, comprising:
   setting, based on a block to be predicted of an image frame, a search template, including:
      in response to determining that a decoding strength is not higher than a threshold, designating a reconstructed reference region of the block to be predicted and the block to be predicted as the search template, the decoding strength referring to a computing capability of a decoder required for decoding; and
      in response to determining that the decoding strength is higher than the threshold, designating the reconstructed reference region of the block to be predicted as the search template, and transmitting a serial number of the search template without transmitting motion information or other position information to the decoder;

searching for, based on a search strategy, an optimal search block of the search template in a reference frame of the image frame; and determining, based on the optimal search block, prediction information of the block to be predicted.

2. The method of claim 1, wherein the searching for an optimal search block of the search template in a reference frame of the image frame based on a search strategy includes:

determining, based on first motion information of the block to be predicted, a start point for a searching operation; and searching for, based on the start point and the search strategy, the optimal search block of the search template in a search range of the reference frame.

3. The method of claim 2, further comprising:

decoding a code stream based on a plurality of syntax elements, the plurality of syntax elements including a first syntax element and a second syntax element, wherein the first syntax element is set to identify a utilization of prediction information to encode the block to be coded, and the second syntax element is set to identify at least one of a setting manner of the search template, a determination manner of the start point, the serial number of the search template, and the search strategy.

4. The method of claim 2, wherein the first motion information includes optimal motion information selected among various second motion information.

5. The method of claim 4, further comprising:

reconstructing, based on an advanced motion vector prediction (AMVP) mode and a merge mode, a candidate motion information list; and designating an average of multiple candidate motion information in the candidate motion information list as the second motion information.

6. The method of claim 5, wherein the determining, based on first motion information of the block to be predicted, a start point for a searching operation includes:

in response to determining that the search strategy is a first search strategy, determining a co-located block that is at a same position as the block to be predicted in the reference frame;

designating a position of the co-located block as the start point; and searching for the optimal search block of the search template in the search range of the reference frame in an integer pixel manner or a sub-pixel manner.

7. The method of claim 5, wherein the determining, based on first motion information of the block to be predicted, a start point for a searching operation includes:

in response to determining that the search strategy is a second search strategy, selecting a portion or all of motion information in the candidate motion information list;

determining a corresponding block in the reference frame using motion information derived from the portion or all of the motion information in the candidate motion information list;

designating the corresponding block in the reference frame as the start point; and searching for the optimal search block of the search template in the search range of the reference frame in an integer pixel manner or a sub-pixel manner.

8. The method of claim 5, wherein the determining, based on first motion information of the block to be predicted, a start point for a searching operation includes:

in response to determining that the search strategy is a third search strategy, determining a corresponding block in the reference frame based on the first motion information;

designating the corresponding block in the reference frame as the start point; and searching for the optimal search block of the search template in the search range of the reference frame in an integer pixel manner or a sub-pixel manner.

9. The method of claim 7, wherein under the AMVP mode, the candidate motion information list includes two motion information candidate terms, and the method further comprises:

determining the corresponding block in the reference frame using a first motion information candidate term of the two motion information candidate terms in the candidate motion information list, a motion vector of the first motion information candidate term being half-pixel accurate.

10. The method of claim 7, wherein under the merge mode, the candidate motion information list includes six motion information candidate terms, and the method further comprises:

determining the corresponding block in the reference frame using any two of the six motion information candidate terms in the candidate motion information list, a motion vector of a first motion information candidate term being one-fourth pixel accurate, and a motion vector of a second motion information candidate term being integer pixel accurate.

11. The method of claim 1, wherein the reconstructed reference region includes one of one or more upper neighboring coded pixels, one or more left neighboring coded pixels, or a combination of one or more upper neighboring coded pixels and one or more left neighboring coded pixels of the block to be predicted.

12. The method of claim 1, further comprising:

in response to determining that the decoding strength is higher than the threshold, performing a decoding operation based on the serial number of the search template, wherein the decoding operation includes:

obtaining the search template based on the serial number of the search template;

searching for the optimal search block in the reference frame based on the search template; and determining an optimal matching block as a prediction value of the block to be predicted based on the optimal search block.

13. The method of claim 1, wherein the search strategy is determined based on the decoding strength.

14. A system for inter frame prediction of a video, comprising:

at least one storage device storing executable instructions, and at least one processor in communication with the at least one storage device, when executing the executable instructions, causing the system to perform operations including:

setting, based on a block to be predicted of an image frame, a search template, including:

in response to determining that a decoding strength is not higher than a threshold, designating a reconstructed reference region of the block to be predicted and the block to be predicted as the search template, the decoding strength referring to a computing capability of a decoder required for decoding; and in response to determining that the decoding strength is higher than the threshold, designating the reconstructed reference region of the block to be predicted as the search template, and transmitting a serial number of the search template without transmitting motion information or other position information to the decoder;

searching for, based on a search strategy, an optimal search block of the search template in a reference frame of the image frame; and determining, based on the optimal search block, prediction information of the block to be predicted.

15. The system of claim 14, wherein the searching for an optimal search block of the search template in a reference frame of the image frame based on a search strategy includes:

determining, based on first motion information of the block to be predicted, a start point for a searching operation; and searching for, based on the start point and the search strategy, the optimal search block of the search template in a search range of the reference frame.

16. The system of claim 15, wherein the first motion information includes optimal motion information selected among various second motion information.

17. The system of claim 14, wherein the reconstructed reference region includes one of one or more upper neighboring coded pixels, one or more left neighboring coded pixels, or a combination of one or more upper neighboring coded pixels and one or more left neighboring coded pixels of the block to be predicted.

18. The system of claim 14, wherein the at least one processor causes the system to perform operations including:

in response to determining that the decoding strength is higher than the threshold, performing a decoding operation based on the serial number of the search template, wherein the decoding operation includes:

obtaining the search template based on the serial number of the search template;

searching for the optimal search block in the reference frame based on the search template; and determining an optimal matching block as a prediction value of the block to be predicted based on the optimal search block.

19. The system of claim 14, wherein the search strategy is determined based on the decoding strength.

20. A non-transitory computer readable medium, comprising a set of instructions, wherein when executed by at least one processor, the set of instructions direct the at least one processor to effectuate a method, the method comprising:

setting, based on a block to be predicted of an image frame, a search template, including:

in response to determining that a decoding strength is not higher than a threshold, designating a reconstructed reference region of the block to be predicted and the block to be predicted as the search template, the decoding strength referring to a computing capability of a decoder required for decoding; and in response to determining that the decoding strength is higher than the threshold, designating the reconstructed reference region of the block to be predicted as the search template, and transmitting a serial number of the search template without transmitting motion information or other position information to the decoder;

searching for, based on a search strategy, an optimal search block of the search template in a reference frame of the image frame; and determining, based on the optimal search block, prediction information of the block to be predicted.

* * * * *